UNITED STATES PATENT OFFICE.

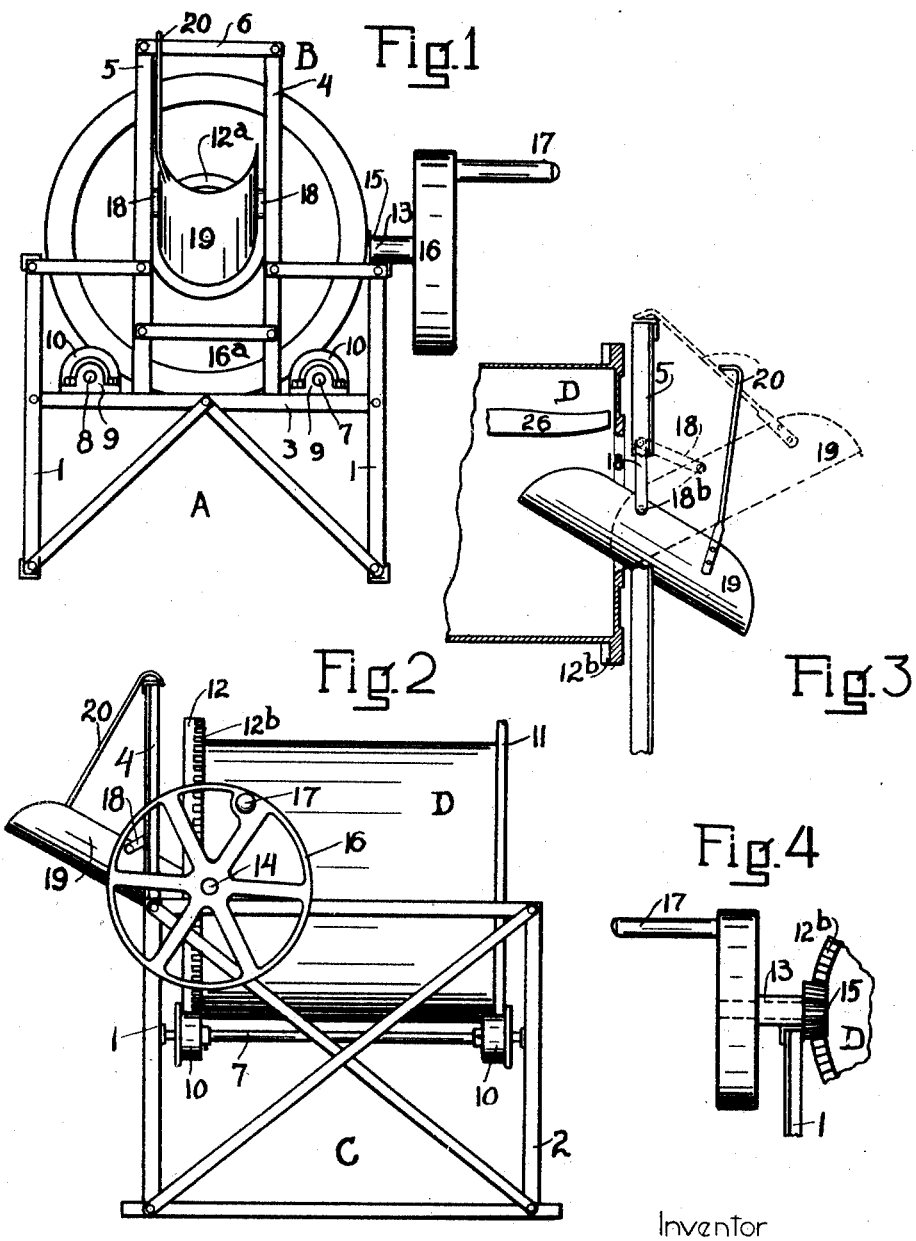

JOHN W. BRABANT, OF LA CROSSE, WISCONSIN.

DISCHARGE-CHUTE.

1,388,696. Specification of Letters Patent. Patented Aug. 23, 1921.

Original application filed July 3, 1917, Serial No. 178,498. Divided and this application filed November 21, 1917. Serial No. 203,088.

*To all whom it may concern:*

Be it known that I, JOHN W. BRABANT, a citizen of the United States of America, whose residence and post-office address is 1311 Kane street, in the city of La Crosse, county of La Crosse, and State of Wisconsin, have invented new and useful Improvements in Discharge-Chutes, of which the following is a specification, reference being had to the accompanying drawings, which are made a part hereof.

The invention has reference to discharge chutes.

The object of the invention is to provide an improved mechanism for discharging material or unloading same, that shall be very simple, easily controlled, and to a large extent avoiding manipulation by hand without the use of power machinery. While adapted to a large variety of machines and the like from which material is to be discharged, I have in this application for a patent shown it as more particularly adapted to use in connection with a cement mixing machine, described and claimed in my co-pending application for patent on improvements in mixing machinery, Serial Number 178,498, filed July 3d, 1917, in which the invention herein described is also shown and described.

In the drawings, Figure 1 shows the rear end of a cement mixing machine to which my improved discharge chute has been applied; Fig. 2 is a side view of the same; Fig. 3 is a detail of the discharge chute, shown in full lines in discharging position and in dotted lines in non-discharging position; Fig. 4 is a detail showing mechanism for rotating the mixing drum to which the chute has been applied.

1—1 are vertical corner posts at the rear end of the frame supporting the mixing drum to which the discharge chute is applied; 2 is one of the front vertical corner posts; 3 is a cross bar between the posts 1—1; 4 and 5 are vertical posts erected upon the cross bar 3 adjacent the discharge opening at the rear end of the mixing drum, 6 is a cross bar at the top of the posts 4 and 5; 7 and 8 are longitudinal shafts beneath the mixing drum D, 9 are boxes on the frame supporting the shafts, 10 are small flanged wheels at each end of the respective shafts; 11 and 12 are flanges projecting beyond the periphery of the drum and resting upon the wheels 10 to turn thereon, $12^b$ is a rack on the vertical face of the flange 12, 13 is a boxing supported on the frame in which turns a shaft 14, having at its inner end a pinion 15 meshing with the rack $12^b$ and at its outer end a pulley 16, to which is secured a handle 17, so that the shaft may be turned by hand or power.

Pivoted at their upper ends upon the posts 4 and 5 are links 18, which at their lower ends are pivoted to a discharge chute 19 at a point $18^b$ that is nearer the receiving end of the chute than to its discharge end; 20 is a handle attached to the discharge end of the chute, and which, at its upper end is formed into a hook, whereby when the chute is swung into non-discharging position, as shown in dotted lines in Fig. 3, the handle may be fastened over the cross-bar 6 at the top of the posts to hold the chute in non-discharging position. 26 is a discharge cup fastened to the inner wall of the mixing drum, shown in position to empty material from the drum into the receiving end of the chute, shown in full lines in Fig. 3 as being swung into the interior of the drum.

It will be noticed that when the chute is held in non-discharging position, as shown by the dotted lines in Fig. 3, the lower ends of the links have been swung outwardly and upwardly, carrying the chute itself bodily outwardly and upwardly so that the entire weight of the links, and chute and handle are beyond the point of support of the upper ends of the links upon the posts 4 and 5; also that with respect to the point of attachment of the chute to the lower ends of the links the weight of the discharge end of the chute with the handle 20 is much greater than the weight of that portion of the chute upon the opposite side of the said point. It will be noted, also, that when the handle 20 is released from the cross bar 6 the force of gravity not only swings the chute bodily downwardly and inwardly, but also automatically tips the chute itself into discharging position with the discharge end down and the receiving end up, as shown in full lines in Fig. 3; and that under practically all conditions of discharging material the force of gravity will hold the chute in discharging position without the use of any fastening devices whatever, and that, because of the peculiar attachment of the chute to the links the receiving end of the chute beyond the point 18ᵇ need be no longer than to bring the receiving end, when in non-discharging position, only to the inner face of the end wall of the drum, entirely out of the way of all material being mixed within the drum. It will also be noted that when the chute is being shifted in either direction, it is constantly changing its angular relation with the links upon which it is supported and that the angle therewith is not the same when in discharging position as it is in non-discharging position.

In operation, when the chute is in non-discharging position, the operator lifts the hook from the cross bar 6, when the chute will by its own weight descend and tip automatically to discharging position; and when it is desired to move it to non-discharging position, the operator, grasping the handle, swings the chute and links outwardly and upwardly into position shown in dotted lines in Fig. 3 and hangs the hook over the cross bar 6, in which position the chute will remain until again released by lifting the handle again.

Having shown and described my invention, what I claim is:

1. In a discharge chute, the combination of a frame, a discharge chute, a loose connection between the center of the chute and the frame permitting the chute to be moved to discharging and to non-discharging position, and means for holding the chute in non-discharging position, the chute when released being adapted to automatically adjust and hold itself in discharging position.

2. In a discharge chute, the combination of a frame, a single link pivotally supported at its upper end upon the frame, a discharge chute, a pivotal connection between the central portion of the chute and the lower end of the link whereby the chute is adapted to be automatically held in discharging position, the angular relation of the chute to the link constantly changing as the chute moves forwardly and backwardly, and means for holding the chute in non-discharging position.

3. In a discharge chute, the combination of a frame, a pair of opposed links pivotally supported at their upper ends upon the frame, a discharge chute being intermediate its ends pivotally connected to the lower ends of the links and adapted to be in discharging position when the links are in their lowest position and out of discharging position when they are raised outwardly, and means for holding the links in their outward and upward position, the weight of the links and chute being adapted to swing the links downwardly when released and the support of the chute upon the links being such as to permit of automatic adjustment and holding of the chute to discharging position with respect to the links when the holding means is released.

4. In a discharge chute, the combination of a frame, a pair of vertical spaced posts on the frame, a pair of links pivoted at their upper ends to the respective posts, a discharge chute, a pivotal connection between the lower ends of the links and the respective sides of the chute at a point nearer to the receiving than to the discharging end of the chute, the chute being adapted to swing bodily to and from discharging position.

5. In a discharge chute, the combination of a frame, a pair of vertical posts on the frame, a pair of links pivoted at their upper ends to the respective posts, a discharge chute, a pivotal connection between the lower ends of the links and the respective sides of the chute and near its longitudinal center permitting the chute to swing bodily to discharging and to non-discharging positions, the suspension of the chute upon the links being such as to hold the chute in discharging position, and means for holding the chute in non-discharging position.

6. In a discharge chute, the combination of a frame, supporting spaced links pivoted to and depending from the frame, a discharge chute, a pivotal connection between the lower ends of the links and the chute nearer to the receiving than to the discharging end of the chute, an upwardly projecting handle rigidly secured to the discharge end of the chute and adapted to be secured to the frame for holding the chute in non-discharging position, the chute being adapted by its suspension upon the links to automatically adjust itself to discharging position when the handle is released.

7. In a discharge chute, the combination of a frame, a link pivotally supported at its upper end upon the frame, a discharge chute, a pivotal connection between the chute and the lower end of the link, means for holding the chute in non-discharging position, the weight of the chute and link being distributed to automatically swing the chute into and hold it in discharging position when the holding means is released, the angular relation between the chute and the link constantly changing as the chute swings to and from discharging position.

JOHN W. BRABANT.